(12) United States Patent
Serebrianski et al.

(10) Patent No.: US 7,984,755 B2
(45) Date of Patent: Jul. 26, 2011

(54) ELECTRICAL CASED WELL-LOGGING METHOD

(75) Inventors: Valeri Vasilievich Serebrianski, Novosibirsk (RU); Vladimir Ilich Yukhlin, Novosibirsk (RU)

(73) Assignee: Limited Liability Company "Interlog" (RU)

( * ) Notice: Subject to any disclaimer, the term of this patent is extended or adjusted under 35 U.S.C. 154(b) by 295 days.

(21) Appl. No.: 12/252,388

(22) Filed: Oct. 16, 2008

(65) Prior Publication Data
US 2011/0147233 A9    Jun. 23, 2011

Related U.S. Application Data

(63) Continuation of application No. PCT/RU2006/000689, filed on Dec. 22, 2006.

(30) Foreign Application Priority Data

Apr. 18, 2006  (RU) .............................. 2006116004

(51) Int. Cl.
    *E21B 49/00* (2006.01)
(52) U.S. Cl. ................. 166/65.1; 166/254.2; 73/152.02; 324/368
(58) Field of Classification Search ............. 166/250.01, 166/254.2, 66, 65.1; 73/152.02; 324/368
    See application file for complete search history.

(56) References Cited

U.S. PATENT DOCUMENTS

| | | | | |
|---|---|---|---|---|
| 3,202,215 | A | * | 8/1965 | Stanonis ..................... 166/305.1 |
| 3,237,094 | A | * | 2/1966 | Blackburn et al. ............ 324/323 |
| 4,820,989 | A | * | 4/1989 | Vail, III ......................... 324/368 |
| 4,882,542 | A | * | 11/1989 | Vail, III ........................ 324/368 |
| 5,335,542 | A | * | 8/1994 | Ramakrishnan et al. .. 73/152.08 |
| 5,543,715 | A | | 8/1996 | Singer et al. |
| 6,249,122 | B1 | * | 6/2001 | Vail et al. ....................... 324/368 |
| 6,603,314 | B1 | | 8/2003 | Kostelnicek et al. |
| 6,919,724 | B2 | * | 7/2005 | Cheung et al. ................ 324/366 |

FOREIGN PATENT DOCUMENTS

| | | | |
|---|---|---|---|
| RU | 2176802 C1 | | 12/2001 |
| RU | 2200967 C1 | | 3/2003 |
| RU | 2384867 C1 | * | 3/2010 |

* cited by examiner

*Primary Examiner* — Daniel P Stephenson
(74) *Attorney, Agent, or Firm* — Paul & Paul (57) ABSTRACT

The invention relates to the geophysical examination of wells and can be used for determining the electrical resistivity of rock beds surrounding a well cased in a metal column. The inventive method consists in using a sonde embodied in the form of two current electrodes located on the opposite sides with respect of at least the measuring electrodes, in alternately supplying electric current, in measuring, by means of a measuring devices, during each current supply, a supplied current, a potential on a central measuring electrode and the potential difference between the outer measuring electrodes and the central electrode, in using the specific electrical resistivity of the rock beds surrounding the cased well in the form of the electrical parameter of the electrical logging of the cased wells, in forming a measuring circuit according to the resistivity pattern of the layers of the rock beds surrounding the well and of those sections of a casing string which are provided with the collars, wherein the sonde, whose measuring electrodes are spaced without respecting equidistance requirements and current electrodes are embodied in such a way that they can be used in the form of measuring electrodes is applied. In addition, the inventive method also consists in measuring the potential difference of an electric field between the current electrode, to which the current is not supplied at the present switching, and the central measuring electrode, by means of additional measuring devices, and in determining a specific electrical resistivity according to a formula referred thereto.

1 Claim, 8 Drawing Sheets

ELECTRICAL CASED WELL-LOGGING METHOD

CROSS-REFERENCE TO RELATED APPLICATIONS

This U.S. Patent application is a continuation and claims the benefit of PCT Application No. PCT/RU2006/000689, filed Dec. 22, 2006, which claims the priority of Russian Application No. RU2006/116004, filed Apr. 18, 2006.

The invention relates to geophysical examination of wells and can be used for determining the electrical resistivity of formations beds surrounding a well cased in a metal string.

The closest related prior art method to this invention in technical idea is a method for electrically logging cased wells, comprising applying electric current, measuring the electric field potential with the use of a multiple-electrode sonde made in the form of three equidistant measuring electrodes and at least two current electrodes positioned beyond the area of the measuring electrodes symmetrically about the central measuring electrode (Russian Patent No. 2,176,802, IPC G01V3/20, priority of Feb. 20, 2001, published Dec. 10, 2001). Each of the current electrodes is alternately supplied with electric current from the same source pole. Each time current is applied, the electric field potential is measured at the point of contact between the central measuring electrode and the string; the first potential difference is measured across the length of the string between the two outer measuring electrodes, and the second potential difference across the same length of the string. Specific electrical resistivity of the formations beds surrounding the string calculated from a suitable formula is used as a parameter for electrically logging cased wells. The prior art method is suitable for measuring the specific electrical resistivity of the formations beds surrounding the cased well by suppressing the effect of the electrical resistivity of the casing string on the measurement results.

The casing string, however, consists of individual pipes joined by coupling collars. The electrical resistivity of the collars, though, can vary depending on the properties of the material, service life, and depth of corrosion.

The closest prior art method is disadvantageous because of a significant distortion of the resistivity measurement results of the formations bed surrounding the string when the coupling collars that have a linear resistivity differing from that of the casing string occur in the spacing between the sonde electrodes.

The inventors have set themselves the task of developing a method of improved accuracy and authenticity of measurement results by suppressing the effect of the coupling collars of the casing string having a linear resistance differing from that of the casing string on the measurement results.

The inventors have achieved their task by an electrical cased-well logging method that includes using a sonde designed in the form of two current electrodes placed on the opposite sides of at least three measuring electrodes; alternately applying electric current; measuring by a measuring device at each current application the electric current applied, the potential across the central measuring electrode; the potential difference between the outer measuring electrodes and the central measuring electrode; using the specific electrical resistance of the formations beds surrounding the string as a parameter for electrical cased-well logging; the measuring circuit being formed in accordance with the resistance model of the layers of the formations beds surrounding the well and sections of the casing string with casing string collars, the measuring electrodes of which are spaced without regard for equal distance requirements, the current electrodes being adapted for use as measuring electrodes, and furthermore the additional measuring devices being used to measure the electrical field potentials between the current electrode to which no current is applied on this connection and the measuring electrode, the specific electrical resistivity being found from the following formula:

$$\rho_{bed} = K_{sonde} \cdot \left[ \frac{2}{Ia_1 \cdot (Ub_3 + \Delta Ub_{13}) + Ib_5 \cdot (Ua_3 + \Delta Ua_{53})} \right] \times \times$$

$$\left[ \frac{(Ua_3 \cdot \Delta Ub_{23} - Ub_3 \cdot Ua_{23}) \cdot (Ua_3 - \Delta Ub_{43} - Ub_3 \cdot Ua_{43})}{(\Delta Ua_{43} \cdot \Delta Ub_{23} - \Delta Ua_{23} \cdot \Delta Ub_{43})} \right],$$

wherein $\rho_{bed}$ is specific electrical resistivity, Ohm·m;
$K_{sonde}$ is the geometrical coefficient of the sonde, m;
$Ia_1$ and $Ib_5$ are currents applied on the first connection to the upper current electrode and on the second connection to the lower current electrode, respectively, A;
$Ua_3$ and $Ub_3$ are electrical field potentials across the central measuring electrode relative to ground on the first and second connections, respectively, V;
$\Delta Ua_{23}$, $\Delta Ua_{43}$, $\Delta Ub_{23}$, and $\Delta Ub_{43}$ are electrical field potential differences on the first and second connections between the upper measuring electrode and the central measuring electrode, and between the lower measuring electrode and the central measuring electrode, respectively, V; and
$\Delta Ua_{53}$ and $\Delta Ub_{13}$ are electrical field potential differences between the lower current electrode to which current is not applied on this first connection and the central measuring electrode, and between the upper current electrode to which current is not applied on this second connection and the central measuring electrode, respectively, V.

The technical effect of the claimed method consists in that it allows the specific electrical resistivity of formations beds to be determined through the steel production string with a high degree of accuracy by taking account of the variable resistance of the string pipes and coupling collars.

Besides, the possibility of the method to be performed without meeting the equal distance requirement of the measuring electrodes helps to significantly simplify the equipment used and the method itself. No equal distance or structural symmetry requirements being made, it is possible to use a sonde design having six or more electrodes.

Figure 1:
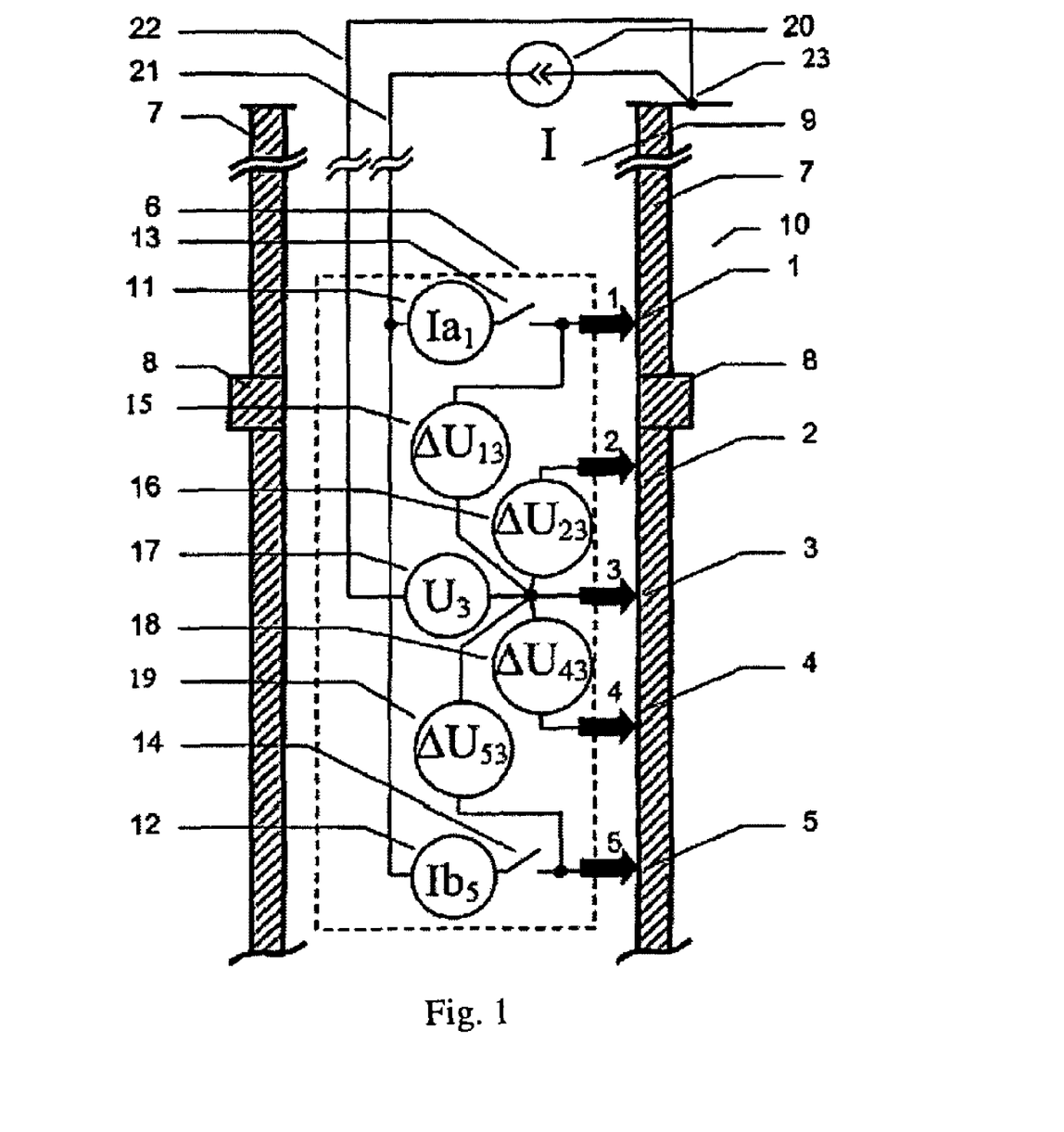
FIG. 1 shows a block diagram illustrating the claimed method, in which: 1 is an upper current electrode; 2 is an upper measuring electrode; 3 is a central measuring electrode; 4 is a lower measuring electrode; 5 is a lower current electrode; 6 is a measuring sonde; 7 is a metal casing string; 8 is a collar of the casing string; 9 is a well to be measured; 10 is the formations beds surrounding the well; 11 and 12 are the measuring devices to measure electrical current strength; 13 and 14 are electronic switches to successively apply current; 15, 16, 17, 18 and 19 are measuring devices used to measure the potential difference; 20 is an alternating current generator; 21 and 22 are independent connection lines; and 23 is a remote grounding electrode.

The method is performed as follows:

The block diagram in FIG. 1 shows an upper current electrode 1, an upper measuring electrode 2, a central measuring electrode 3 and a lower measuring electrode 4, a lower current electrode 5 of a measuring sonde 6, all mechanically pressed against the inner surface of a metal casing string 7 with collars 8. The well 9 is surrounded with formations beds 10.

The measuring sonde 6 comprises measuring devices 11 and 12 for measuring electric current strength, electronic switches 13 and 14 for successively applying current to electrodes 1 and 5, respectively, and measuring devices 15, 16, 17, 18, and 19 for measuring potential difference.

Alternating current generator 20 is located on the ground surface and is connected to the measuring sonde by connection line 21. The potential of central measuring electrode 3 is measured by measuring device 17 through independent connection line 22 relative to remote grounded electrode 23 located on the ground surface.

Below follows is a description of the principle used to log cased wells in which the electrical resistivity of the casing string is not constant. Moreover, the value of the electrical resistivity depends significantly on whether or not any casing string collars occur in the measuring section.

Measurements are taken as follows: the sonde electrodes are mechanically forced away from the inner surface of the casing string, and the sonde is moved to a desired distance along the axis z in the direction of the well axis by a logging cable, not shown in FIG. 1. The sonde movement is then stopped, and the electrodes are mechanically pressed against the inner surface of the casing string. In this case, a casing string collar may or may not accidentally happen to be located between the sonde electrodes. At the first current application, electronic switch 13 closes, while electronic switch 14 remains open, and current is applied from generator 20 along connection line 21 to upper electrode 1. The electrical field strength is then measured by measuring device 11, and the potential differences by measuring devices 16, 17, 18 and 19. At the second current application, electronic switch 13 opens, while electronic switch 14 closes, and current is applied from generator 20 along connection line 21 to lower current electrode 5. The electrical field strength is measured by measuring device 12, and the potential differences by measuring devices 15, 16, 17 and 18. The measuring cycle is then repeated.

The electric current strength measurement results taken by measuring devices 11 and 12 and potential difference results measured by measuring devices 15, 16, 17, 18 and 19 in the two successive current applications are transmitted to the computer for processing. The connection line to the computer and the computer itself are not shown in FIG. 1. The specific electrical resistivity $\rho_{bed}$ is calculated from the formula. The curve of specific electrical resistivity $\rho_{bed}$ at depth z is constructed by successively moving the measuring sonde along axis z. The device to measure axis z is not shown in the block diagram.

The well being measured successively crosses the geological formations beds, the specific electrical resistivity of which is to be studied by the claimed method. The exact structure of the formations beds is not, however, known beforehand, but in a first approximation, the well axis extends at right angles to the direction of the geological beds.

Since the electrical resistivity of the casing string of the well to be measured is significantly smaller than the resistivity of the formations beds surrounding the well, current is directed near the well at right angles to the well axis, so that the well itself and its casing string exert focusing properties in respect of current direction.

The total resistivity $R_{bed}$ of the cylindrical layer of the formations beds having a specific resistivity $\rho_{bed}$ from the casing string of diameter D to a point at a distance S from the well, on the assumption of uniformity of the formations beds, for a vertical well section H is:

$$R_{bed} = \frac{c_{bed}}{2 \cdot \pi \cdot H} \cdot \ln\left(\frac{2 \cdot S}{D}\right).$$

For a typical casing string diameter of 0.15 to 0.2 m and the distance between the well being measured and the remote grounding well ranging from 50 to 500 m, a half of the total electrical resistivity of the cylindrical layer is generated over a section 2 m to 6 m from the casing string, that is, the formations bed layers near the well make the major contribution to the total electrical resistivity, while the remote layers do not virtually have an effect on the total resistivity.

Figure 2:
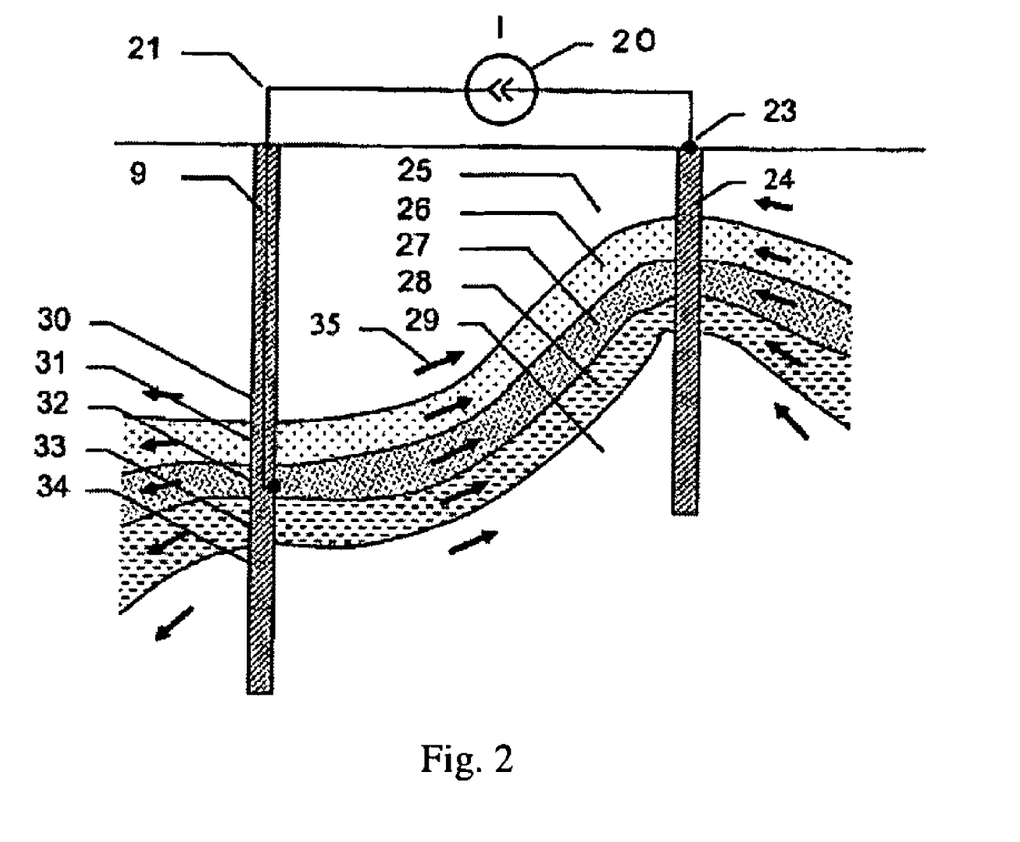
FIG. 2 illustrates the flow of currents away from the well axis, in which 9 is the well to be measured; 20 is an alternating current generator; 21 is an independent connection line; 23 is a remote grounding electrode; 24 is a remote grounding well; 25, 26, 27, 28 and 29 are layers of formations beds surrounding the well; 30, 31, 32, 33 and 34 are sonde electrode zones; and 35 are current flow directions in the beds.

FIG. 2 illustrates current flows from the well axis, when alternating current generator 20 is connected, between well 9 being measured and remote grounding well 24 through grounding electrode 23 and connection line 21.

The spatial boundaries of layers 25, 26, 27, 28 and 29 through which current flows are identical to the electrical field lines of force drawn from the imaginary boundaries of sonde electrodes 30, 31, 32, 33 and 34. Currents flow from measuring well 9 along the electrical field lines of force and are shown symbolically by arrows 35.

Since both the current direction and the geological formations bed layers are, in the first approximation, normal to the well axis, the layers through which current flows coincide with the geological formations layers near the well, that is, in the area where the bulk of the total electrical resistivity is generated. At a large distance from the well axis, the current flow layers and real geological layers of the formations beds do not coincide, but their contribution to the total electrical resistivity is insignificant, and this lack of coincidence is dismissed.

Since the current flow boundaries coincide with the electrical field lines, no currents flow across layer boundaries. The layers could be regarded as independent resistances, which allows an easy transition to be made to a resistance model of layers of formations beds surrounding the well and sections of the casing string, the resistance model of layers of formations beds surrounding the well to be represented in the form of an equivalent electrical resistance circuit, and to form a measuring circuit on the basis of the electrical resistance circuit.

Figure 3:
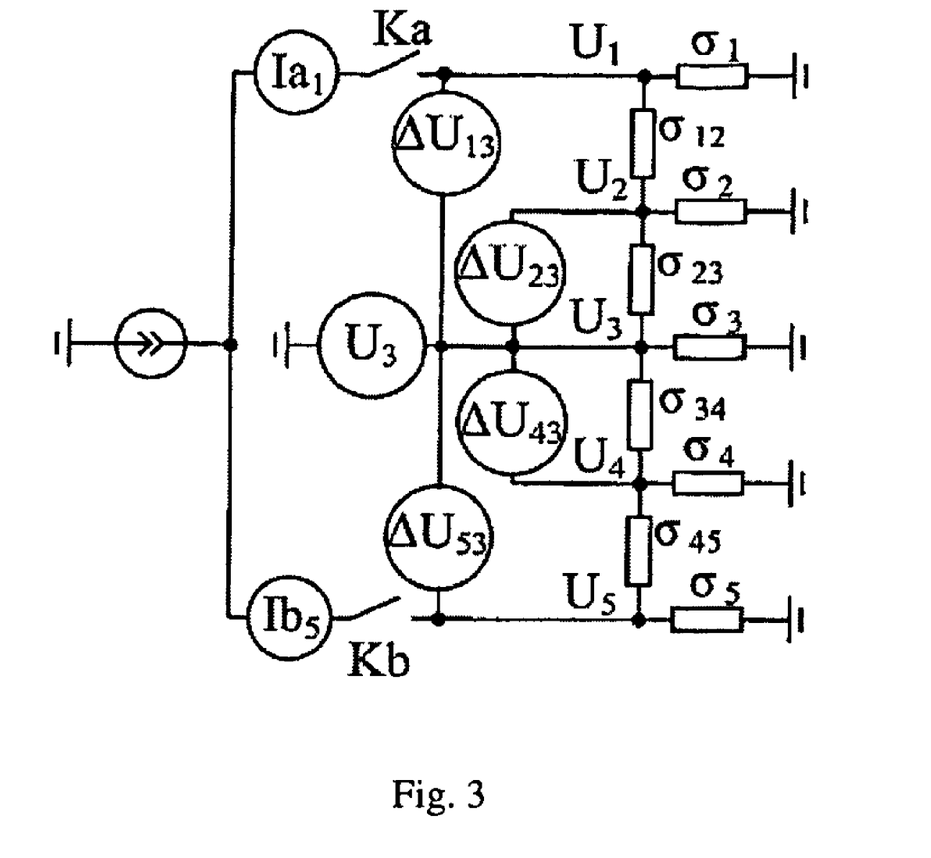
FIG. 3 illustrates an equivalent electrical resistance circuit of a resistance model of layers of formations beds surrounding the well and sections of the casing string.

FIG. 3 illustrates an equivalent electric circuit of the resistance model of layers of formations beds surrounding the well and casing string sections. For convenience of formula writing, all resistances are represented as conductivities. Conductivities $\sigma_{12}$, $\sigma_{23}$, $\sigma_{34}$, and $\sigma_{45}$ correspond to the conductivities of casing string sections with collars accidentally occurring between the measuring sonde electrodes 1 and 2, 2 and 3, 3 and 4, and 4 and 5, respectively.

The conductivities $\sigma_2$, $\sigma_3$, and $\sigma_4$ correspond to the conductivities of the layers of formations beds surrounding the well from electrodes 2, 3 and 4, respectively.

Moreover, the conductivity $\sigma_3$ corresponds to the conductivity of the formations layer surrounding the well from central measuring electrode 3 and is related to the electrical resistivity described by the following formula:

$$\rho_{bed} = \frac{K_{sonde}}{\sigma_3},$$

wherein $\rho_{bed}$ is specific electrical resistivity, Ohm·m;
$K_{sonde}$ is the geometrical coefficient of the sonde, m; and
$\sigma_3$ is the conductivity of the layer from central measuring electrode 3, Ohm$^{-1}$.

The geometrical coefficient $K_{sonde}$ of the sonde depends on the diameter of the casing string pipes, the total length of the casing string pipes, and the spacing between the current and measuring electrodes of the sonde, and is found empirically for each specific design of the sonde. The approximate formula for $K_{sonde}$ is:

$$K_{sonde} \approx \pi \cdot \Delta h_{24},$$

wherein $\Delta h_{24}$ is the distance between measuring sonde electrodes 2 and 4, m.

Conductivity $\sigma_1$ corresponds to the conductivity of the layer from electrode 1 and through the top part of the casing string. Conductivity $y_5$ corresponds to the conductivity of the layer from electrode 5 and through the bottom part of the casing string.

Voltages across electrodes 1, 2, 3, 4 and 5 are designated as $U_1$, $U_2$, $U_3$, $U_4$ and $U_5$, respectively. Electronic switches Ka and Kb enable current application successively to electrodes 1 and 5. The first application is designated as application "a", and the second application as application "b".

A measurement circuit is built in accordance with the equivalent electrical resistance circuit corresponding to the resistance model of the formations beds surrounding the well. Current meters $Ia_1$ and $Ib_5$ are connected in series with the electronic switches at the first current application to current electrode 1 and at the second current application to current electrode 5, respectively. The meters of difference between the potentials $U_3$, $\Delta U_{13}$, $\Delta U_{23}$, $\Delta U_{43}$, and $\Delta U_{53}$ are connected at the first and second current applications between electrode 3 and ground, between electrodes 1 and 3, between electrodes 2 and 3, between electrodes 4 and 3, and between electrodes 5 and 3, respectively.

Meters $\Delta U_{13}$ and $\Delta U_{53}$ are provided to measure the electrical field potential difference between upper current electrode 1 that is not on this first connection supplied with current and central measuring electrode 3, and between lower current electrode 5 that is not, on this second connection, supplied with current and central measuring electrode 3, respectively. The current electrodes are suitable for use as measuring electrodes; for example, in a measuring circuit, in which current is applied to the current electrode along one conductor, and the voltage to be measured is applied from the current electrode to the voltage meter along another conductor shielded against induced currents.

The claimed model is advantageous because with the collars of the casing string occurring in the intervals between the sonde electrodes, their resistance is counted in as a sum of resistances of the casing pipe section and the resistance of the collar in the form of conductances $\sigma_{12}$, $\sigma_{23}$, $\sigma_{34}$, and $\sigma_{45}$. This approach allows the influence of the collar resistance on the measurement results to be fully canceled in measuring the specific resistivity.

A node potential method is used to write five equations for five nodes on the first connection and five equations for five nodes on the second connection:

$$\begin{cases} Ua_1 \cdot \sigma_1 + (Ua_1 - Ua_2) \cdot \sigma_{12} = Ia_1 \\ Ua_2 \cdot \sigma_2 + (Ua_2 - Ua_1) \cdot \sigma_{12} + (Ua_2 - Ua_3) \cdot \sigma_{23} = 0 \\ Ua_3 \cdot \sigma_3 + (Ua_3 - Ua_3) \cdot \sigma_{23} + (Ua_3 - Ua_4) \cdot \sigma_{34} = 0 \\ Ua_4 \cdot \sigma_4 + (Ua_4 - Ua_3) \cdot \sigma_{34} + (Ua_4 - Ua_5) \cdot \sigma_{45} = 0 \\ Ua_5 \cdot \sigma_5 + (Ua_5 - Ua_4) \cdot \sigma_{45} = 0 \\ Ub_1 \cdot \sigma_1 + (Ub_1 - Ub_2) \cdot \sigma_{12} = 0 \\ Ub_2 \cdot \sigma_2 + (Ub_2 - Ub_1) \cdot \sigma_{12} + (Ub_2 - Ub_3) \cdot \sigma_{23} = 0 \\ Ub_3 \cdot \sigma_3 + (Ub_3 - Ub_2) \cdot \sigma_{23} + (Ub_3 - Ub_4) \cdot \sigma_{34} = 0 \\ Ub_4 \cdot \sigma_4 + (Ub_4 - Ub_3) \cdot \sigma_{34} + (Ub_4 - Ub_5) \cdot \sigma_{45} = 0 \\ Ub_5 \cdot \sigma_5 + (Ub_5 - Ub_4) \cdot \sigma_{45} = Ib_5 \end{cases} \quad (1)$$

Considering all the voltages to be known, therefore, the result is 10 equations and 9 unknowns, $y_1$ to $y_9$, that is, the system of equations is redundant. To simplify the system of equations, all the voltage differences are measured with respect to central measuring electrode 3. By successively eliminating one equation each time and considering that:

$$\begin{cases} \Delta Ua_{13} = Ua_1 - Ua_3 \\ \Delta Ua_{23} = Ua_2 - Ua_3 \\ \Delta Ua_{43} = Ua_4 - Ua_3 \\ \Delta Ua_{53} = Ua_5 - Ua_3 \\ \Delta Ub_{13} = Ub_1 - Ub_3 \\ \Delta Ub_{23} = Ub_2 - Ub_3 \\ \Delta Ub_{43} = Ub_4 - Ub_3 \\ \Delta Ub_{53} = Ub_5 - Ub_3 \\ \rho_{bed} = \dfrac{K_{sonde}}{\sigma_3} \end{cases}$$

all possible solutions for $\rho_{bed}$ are found. Four accurate solutions have been found for 10 variants of such systems out of nine equations.

Four of them are given below:

$$\rho_{\text{п.п}} = K_{\text{зонд}} \cdot \left[ \frac{1}{Ia_1 \cdot (Ub_3 + \Delta Ub_{13})} \right] \times \times \quad (2)$$

$$\left[ \frac{\left( \frac{Ua_3 \cdot \Delta Ub_{23}}{Ub_3 \cdot \Delta Ua_{23}} - \right) \cdot \left( \frac{Ua_3 \cdot \Delta Ub_{43}}{Ub_3 \cdot \Delta Ua_{43}} - \right)}{\left( \frac{\Delta Ua_{43} \cdot \Delta Ub_{23}}{\Delta Ua_{23} \cdot \Delta Ub_{43}} - \right)} \right]$$

$$\rho_{\text{п.п}} = K_{\text{зонд}} \cdot \left[ \frac{1}{Ib_5 \cdot (Ua_3 + \Delta Ua_{53})} \right] \times \times \quad (3)$$

$$\left[ \frac{\left( \frac{Ua_3 \cdot \Delta Ub_{23}}{Ub_3 \cdot \Delta Ua_{23}} - \right) \cdot \left( \frac{Ua_3 \cdot \Delta Ub_{43}}{Ub_3 \cdot \Delta Ua_{43}} - \right)}{\left( \frac{\Delta Ua_{43} \cdot \Delta Ub_{23}}{\Delta Ua_{23} \cdot \Delta Ub_{43}} - \right)} \right]$$

wherein $\rho_{\text{п.п}} = \rho_{bed}$, $K_{\text{зонда}} = K_{sonde}$.

Since $\Delta Ua_{53}$ and $\Delta Ub_{13}$ are electrical field potential differences (between lower current electrode 5 that is not supplied with current on the first connection and central measuring electrode 3, and between upper current electrode 1 that is not supplied with current on the second connection and central measuring electrode 3, respectively), additional measurements are required across the current electrodes.

The following computation formula is obtained by averaging the two solutions:

$$\rho_{\text{п.п}} = K_{\text{зонд}} \cdot \left[ \frac{2}{Ia_1 \cdot (Ub_3 + \Delta Ub_{13}) + Ib_5 \cdot (Ua_3 + \Delta Ua_{53})} \right] \times \times \quad (4)$$

$$\left[ \frac{\left( \frac{Ua_3 \cdot \Delta Ub_{23}}{Ub_3 \cdot \Delta Ua_{23}} - \right) \cdot \left( \frac{Ua_3 \cdot \Delta Ub_{43}}{Ub_3 \cdot \Delta Ua_{43}} - \right)}{\left( \frac{\Delta Ua_{43} \cdot \Delta Ub_{23}}{\Delta Ua_{23} \cdot \Delta Ub_{43}} - \right)} \right]$$

wherein $\rho_{\text{п.п}} = \rho_{bed}$ is the specific electrical resistivity, Ohm·m;

$K_{\text{зонда}} = K_{sonde}$ is the geometric coefficient of the sonde, m;

$Ia_1$ and $Ib_5$ are currents applied on the first connection to upper current electrode 1 and on the second connection to lower current electrode 5, respectively, A;

$Ua_3$ and $Ub_3$ are electrical field potentials across central electrode 3 relative to ground on the first and second connections, respectively, V;

$\Delta Ua_{23}$, $\Delta Ua_{43}$, $\Delta Ub_{23}$, and $\Delta Ub_{43}$ are electrical field potential differences on the first and second connections between upper measuring electrode 2 and central measuring electrode 3, and between lower measuring electrode 4 and central measuring electrode 3, respectively, V; and $\Delta Ua_{53}$ and $\Delta Ub_{13}$ are electrical field potential differences between lower current electrode 5 that is not supplied with current on the first connection and central measuring electrode 3, and between upper current electrode 1 that is not supplied with current on the second connection and central measuring electrode 3, respectively, V.

The remaining two solutions are not dealt with here because of their complexity, lack of any additional advantages, and a higher total error in measurement.

A measuring circuit built in accordance with the resistance model of the layers of formations beds surrounding the well allows the effect of casing string sections with collars accidentally occurring in the measurement section of the casing string between either the measuring electrodes or between the measuring and current electrode to be taken into account. The additional measuring devices and the current electrodes being alternatively used as measuring electrodes makes it possible to use the precise analytical solutions of the system of equations of formula (4) in measuring the specific electrical resistivity of formations beds.

The resistance model used to measure the specific electrical resistivity of formations beds according to formula (4) does not require the electrodes to be spaced at equal distances or the setup to be symmetrical about the central electrode because formula (4) is an averaged arithmetic expression of two precise solutions and does not depend on the conductances $\sigma_{12}$, $\sigma_{23}$, $\sigma_{34}$, and $\sigma_{45}$.

No equidistant arrangement of the measuring electrodes being required, the equipment used and the method itself are simplified significantly.

Since it is not required for the electrodes to be arranged at equal distances or the setup to be symmetrical, sonde designs having six or more electrodes can be used.

The system of equations being increased by two equations, with two more unknowns added, formula (4) is valid for any number of electrodes, provided two connections are used with currents applied to the outer current electrodes. Increasing the number of electrodes gives a higher logging accuracy compared with a five-electrode sonde, in particular, a six-electrode sonde doubles the logging speed; and a seven-electrode sonde trebles it, while extending the probe length by 0.5 m and 1.0 meters, respectively.

FIGS. 4 to 8 illustrate calculations of $\rho_{bed}$ by the claimed method and by the prior art method for three mathematical media models.

The measurement environment has a diameter of 250 m and a depth of 227 m, the string is 207 m long, and the group of beds lies at a depth of 100 m. The string has an inner diameter of 0.075 m and an outer diameter of 0.083 m. The string has a specific electrical resistivity of $2.5 \cdot 10^{-7}$ Ohm·m. Electrodes 1 and 5 of the measuring sonde are spaced from central electrode 3 at 2.2 m, and electrodes 2 and 4 are spaced from central electrode 3 at 0.5 m.

The first medium model consists of a group of beds:
the first layer has a specific electrical resistivity of 5 Ohm·m and extends in depth from minus infinity to 2 m;
the second bed has a resistivity of 10 Ohm·m and extends in depth from 2 m to 3 m;
the third bed has a resistivity of 5 Ohm·m and extends in depth from 3 m to 5 m;
the fourth bed has a resistivity of 100 Ohm·m and extends in depth from 5 m to 8 m;
the fifth bed has a resistivity of 1 Ohm·m and extends in depth from 8 m to 10 m; and
the sixth bed has a resistivity of 10 Ohm·m and extends in depth from 10 m to plus infinity.

All the beds are penetrated by a string of uniform resistivity.

The second medium model consists of three beds. Two of them are enclosing beds having an electrical resistivity of 1 Ohm·m, and the third bed sandwiched between them has a thickness of 1 m and a specific electrical resistivity of 10 Ohm·m. The beds are penetrated by a string of non-uniform electrical resistivity. The interval between −1.3 m and −1.0 m receives a model of a reducing string collar, having a specific electrical resistivity that can be increased by a multiple of 10, 100 or 1,000 compared to the specific electrical resistivity of the string.

A third medium model differs from the second model in that the model of the reducing string collar extends within the range of −0.1 to 0.2 m.

Figure 4:
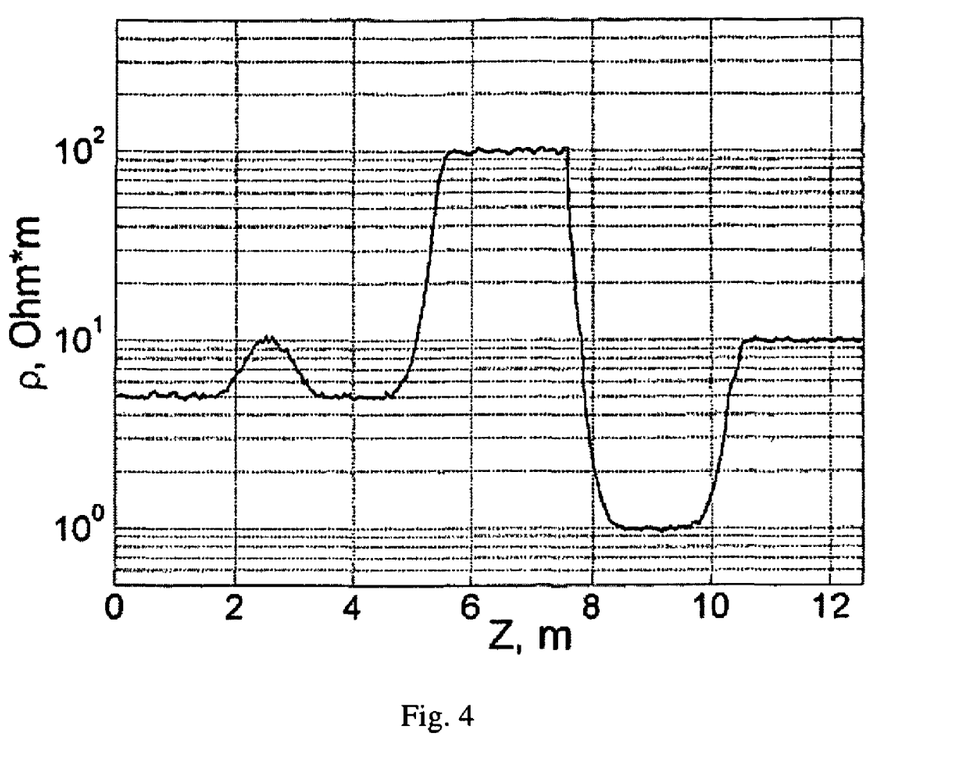
FIG. 4 illustrates a modeling curve using the claimed method on a model of environment 1.

FIG. 4 illustrates the results of modeling performed by the claimed method on medium model 1. The simulation curve showing the ratio of specific electrical resistivity to z accurately represents the real specific electrical resistivity of the beds, the measurement error for specific electrical resistivity lying within 10%, and the accuracy of bed boundary identification is no worse than ±0.3 m.

Figure 5:
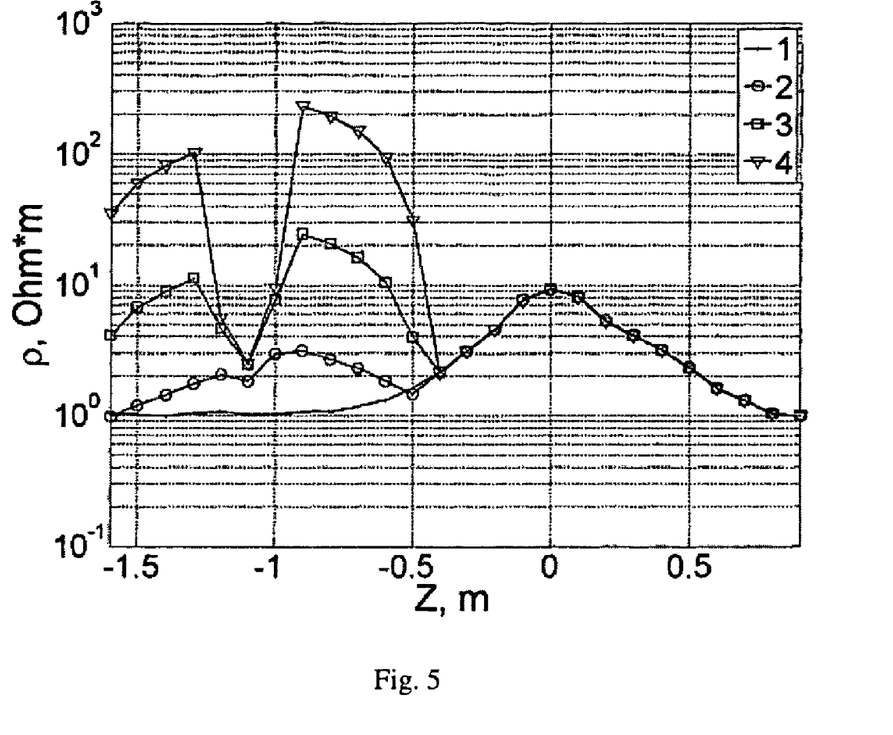
FIG. 5 illustrates modeling curves using the prior art method on a model of environment 2, wherein 1, 2, 3 and 4 are modeling curves at a ratio of the specific electrical resistance of the collar to the specific electrical resistance of the casing string equal to 1, 10, 100, and 1,000, respectively.

FIG. 5 illustrates model curves obtained by the prior art method [1] on a model of medium 2, wherein 1, 2, 3 and 4 are modeling curves at a ratio of the specific electrical resistivity of the collar to the specific electrical resistivity of the casing string of 1, 10, 100, and 1,000, respectively.

Figure 6:
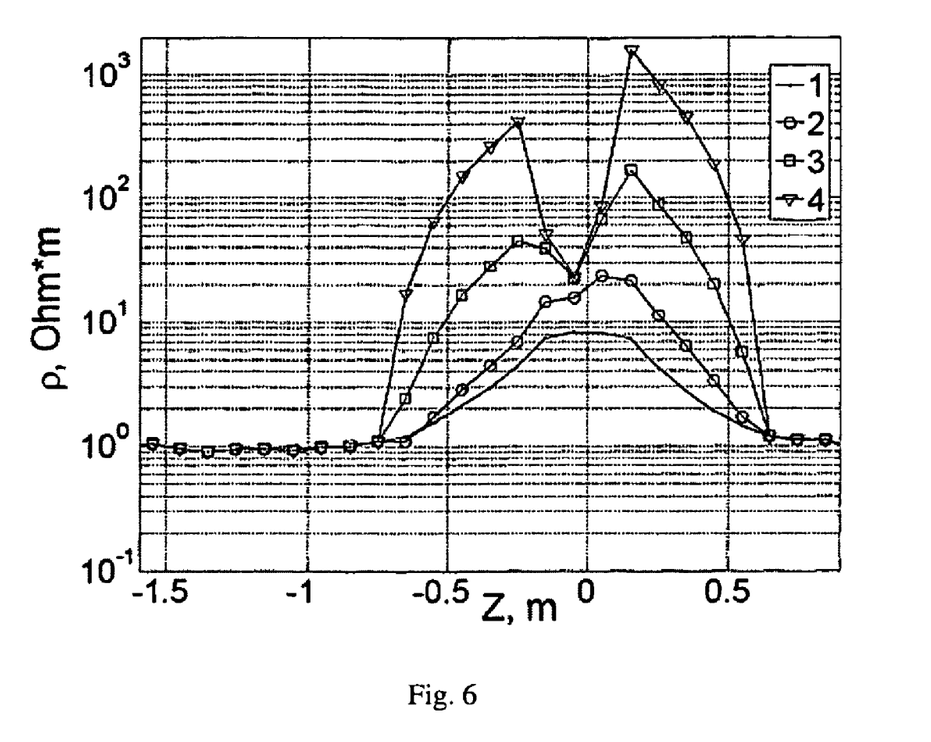
FIG. 6 illustrates modeling curves using the prior art method on a model of environment 3, wherein 1, 2, 3 and 4 are modeling curves at a ratio of the specific electrical resistance of the collar to the specific electrical resistance of the casing string equal to 1, 10, 100, and 1,000, respectively.

FIG. 6 illustrates modeling curves obtained by the prior art method [1] on a model of medium 3, wherein 1, 2, 3 and 4 are modeling curves at a ratio of the specific electrical resistivity of the collar to the specific electrical resistivity of the casing string of 1, 10, 100, and 1,000, respectively.

Figure 7:
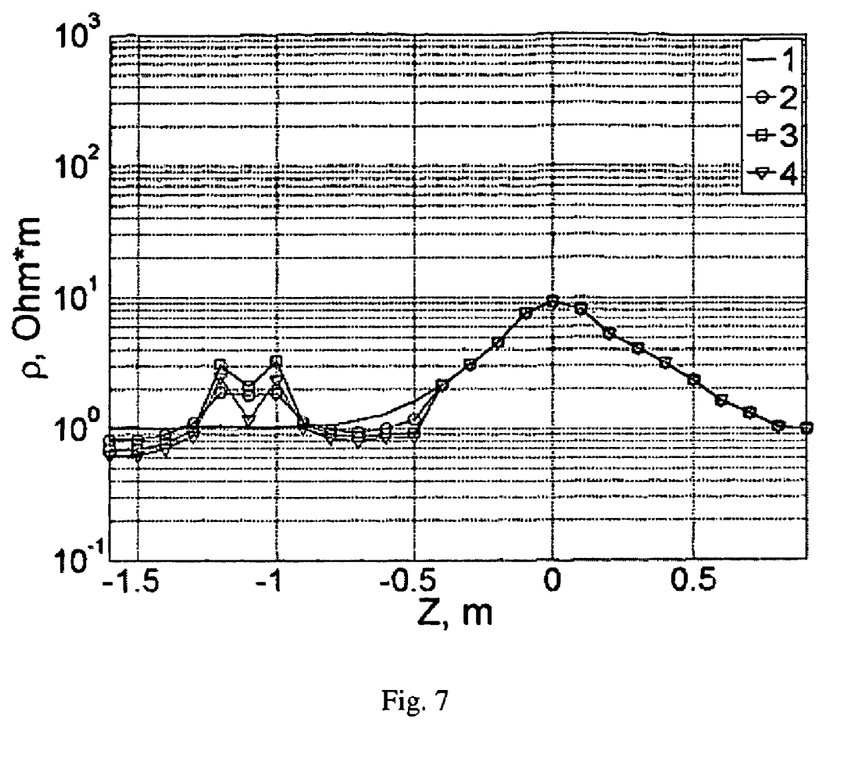
FIG. 7 illustrates modeling curves using the claimed method according to Formula (4) on a model of environment 2, wherein 1, 2, 3 and 4 are modeling curves at a ratio of the specific electrical resistance of the collar to the specific electrical resistance of the casing string equal to 1, 10, 100, and 1,000, respectively.

FIG. 7 illustrates modeling curves obtained by the claimed method using formula (4) on a model of medium 2, wherein 1, 2, 3 and 4 are modeling curves at a ratio of the specific electrical resistivity of the collar to the specific electrical resistivity of the casing string of 1, 10, 100, and 1,000, respectively.

Figure 8:
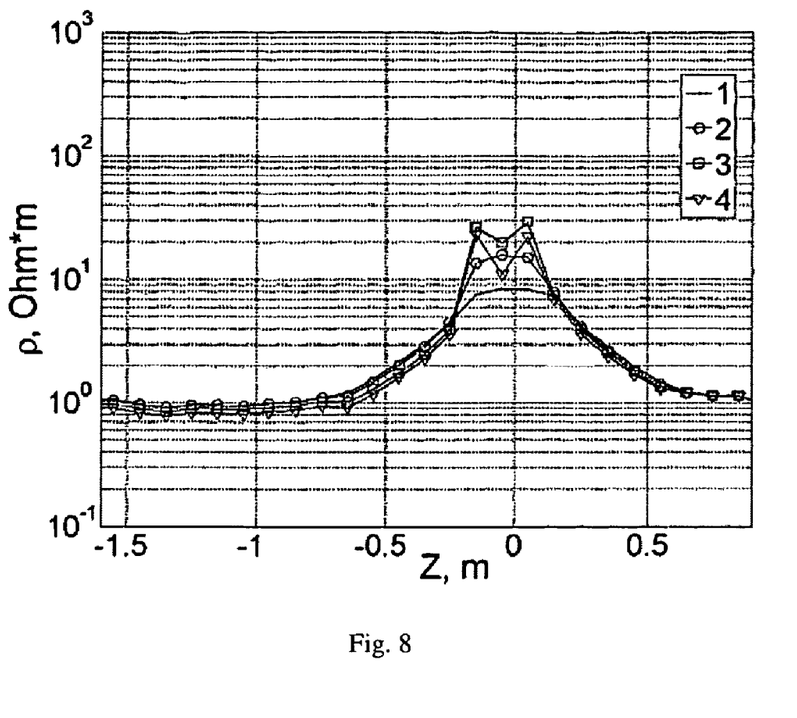
FIG. 8 illustrates modeling curves using the claimed method according to Formula (4) on a model of environment 3, wherein 1, 2, 3 and 4 are modeling curves at a ratio of the specific electrical resistance of the collar to the specific electrical resistance of the casing string equal to 1, 10, 100, and 1,000, respectively.

FIG. 8 illustrates modeling curves obtained by the claimed method using formula (4) on a model of medium 3, wherein 1, 2, 3 and 4 are modeling curves at a ratio of the specific electrical resistivity of the collar to the specific electrical resistivity of the casing string of 1, 10, 100, and 1,000, respectively.

Comparison between FIGS. 5 and 7, and 6 and 8, respectively, shows that when the specific resistivity of the casing string collar does not differ from that of the casing string, the modeling curves for the specific electrical resistivity of the beds in the prior art method and those in the claimed method yield virtually identical results.

At a ratio of the specific electrical resistivity of the collar to that of the casing string equal to 10, 100, and 1,000, the calculated specific resistivity of the beds produces an error relative to the true specific resistivity of the beds. Moreover, calculations made according to the prior art method produce an error of 200%, 2,400%, and 20,000%, respectively, for the specific electrical resistivity of 10 Ohm·m, and 150%, 1,900%, and 17,000%, respectively, for the specific electrical resistivity of 10 Ohm·m. In this case, the effect of the collar of a model of the reducing string collar 0.3 m long is observed as the sonde moves over a distance of 1.5 m, that is, the full length of the collar travel through the central electrodes of the sonde. An acceptable error of 250% is only produced when the central electrode is in alignment with the center of the collar model, as is clearly shown in FIGS. 5 and 6.

When calculations are done by the claimed method using formula (4) at a ratio of the specific electrical resistivity of the collar to that of the casing string equal to 10, 100 and 1,000, they produce an error of 90%, 150% and 200%, respectively, for a specific electrical resistivity of 1 Ohm·m, and 50%, 170%, and 150%, respectively, for a specific electrical resistivity of 10 Ohm·m. In this case, the effect of the collar in a model of the reducing string collar 0.3 m long is observed as the sonde moves over a length equal to the length of the collar. When the central electrode is in alignment with the center of the collar model, the error is equal to 80%, 120%, and 30%, respectively, as is clearly shown in FIGS. 7 and 8.

Therefore, the measurement error in the claimed method is smaller at a ratio of the specific electrical resistivity of the collar to that of the casing string equal to 10, 100, and 1,000 is smaller by a factor of 2.2, 16, and 100, respectively, for a specific electrical resistivity of 1 Ohm·m, and 3, 11, and 113, respectively, for a specific electrical resistivity of 10 Ohm·m.

Compared with the prior art method, the claimed method achieves a higher accuracy and authenticity of measurements by taking account of the effect of the variable resistivity of the string pipes and collars of the casing string.

The method offers the following advantages:

Electrical methods of examining wells are central to determining the productive intervals of reservoirs during well construction. Implementation of the claimed method to measure specific electrical resistivity of formations through a steel productive string using geophysical equipment certainly produces a significant economic effect. Combining the claimed method with existing radioactive and acoustic logging methods to examine oil wells cased with steel productive strings helps to significantly enhance the authenticity of the position of the water-oil boundary determined in the productive intervals of reservoir beds of operating oil wells in practically any geological conditions, which, in turn, allows for a more effective operation of the oil fields. Besides, it will be possible to determine, in terms of quantity, the saturation of reservoir beds that have not been examined by standard electrical logging methods during well construction.

What is claimed is:

1. An electrical cased-well logging method, comprising using a sonde in the form of two current electrodes located on the opposite sides of at least three measuring electrodes; alternately applying electric current; measuring, with the use of a measuring device, during each current application, the current applied, the potential across the central measuring electrode, the potential difference between the two outer electrodes and the central measuring electrode; using the specific electrical resistivity of formation beds surrounding the well as an electrical logging parameter of cased wells, wherein use is made of a sonde having measuring electrodes spaced at distances that are required to be equal; additional measuring devices are used to measure the differences in electrical field potentials between a current electrode that is not supplied with current on connection and the central measuring electrodes, and the specific electrical resistivity is found from the formula:

$$\rho_{bed} = K_{sonde} \cdot \left[ \frac{2}{Ia_1 \cdot (Ub_3 + \Delta Ub_{13}) + Ib_5 \cdot (Ua_3 + \Delta Ua_{53})} \right] \times \times \left[ \frac{\left( \frac{Ua_3 \cdot \Delta Ub_{23} -}{Ub_3 \cdot \Delta Ua_{23}} \right) \cdot \left( \frac{Ua_3 \cdot \Delta Ub_{43} -}{Ub_3 \cdot \Delta Ua_{43}} \right)}{\left( \frac{\Delta Ua_{43} \cdot \Delta Ub_{23} -}{\Delta Ua_{23} \cdot \Delta Ub_{43}} \right)} \right]$$

wherein $\rho_{bed}$ is specific electrical resistivity, Ohm·m;

$K_{sonde}$ is the geometrical coefficient of the sonde, m;

$I_{a1}$ and $I_{b5}$ are currents applied on the first connection to the upper current electrode and on the second connection to the lower current electrode, respectively, A;

$Ua_3$ and $Ub_3$ are electrical field potentials across the central measuring electrode relative to ground on the first and second connections, respectively, V;

$\Delta Ua_{23}$, $\Delta Ua_{43}$, $\Delta Ub_{23}$, and $\Delta Ub_{43}$ are electrical field potential differences on the first and second connections between the upper measuring electrode and the central measuring electrode, and between the lower measuring electrode and the central measuring electrode, respectively, V; and $\Delta Ua_{53}$ and $\Delta Ub_{13}$ are electrical field potential differences between the lower current electrode to which current is not applied on this first connection and the central measuring electrode, and between the upper current electrode to which current is not applied on this second connection and the central measuring electrode, respectively, V.

* * * * *

UNITED STATES PATENT AND TRADEMARK OFFICE
CERTIFICATE OF CORRECTION

| | | |
|---|---|---|
| PATENT NO. | : 7,984,755 B2 | Page 1 of 1 |
| APPLICATION NO. | : 12/252388 | |
| DATED | : July 26, 2011 | |
| INVENTOR(S) | : Valeri Vasilievich Serebrianski et al. | |

It is certified that error appears in the above-identified patent and that said Letters Patent is hereby corrected as shown below:

Column 10, line 30: delete "tances that are required to be equal; additional measuring" and
insert -- tances that are not required to be equal; additional measuring --

Signed and Sealed this
Twenty-seventh Day of September, 2011

David J. Kappos
*Director of the United States Patent and Trademark Office*